US009150442B2

(12) United States Patent
Sortwell

(10) Patent No.: US 9,150,442 B2
(45) Date of Patent: *Oct. 6, 2015

(54) METHOD FOR DISPERSING AND AGGREGATING COMPONENTS OF MINERAL SLURRIES AND HIGH-MOLECULAR WEIGHT MULTIVALENT POLYMERS FOR CLAY AGGREGATION

(75) Inventor: Edwin T. Sortwell, St. Simons Island, GA (US)

(73) Assignee: SORTWELL & CO., St. Simons Island, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/704,215

(22) PCT Filed: Jul. 19, 2011

(86) PCT No.: PCT/US2011/044437
§ 371 (c)(1),
(2), (4) Date: Apr. 9, 2013

(87) PCT Pub. No.: WO2012/018514
PCT Pub. Date: Feb. 9, 2012

(65) Prior Publication Data
US 2013/0186838 A1 Jul. 25, 2013

Related U.S. Application Data

(60) Provisional application No. 61/367,834, filed on Jul. 26, 2010, provisional application No. 61/367,812, filed on Jul. 26, 2010, provisional application No. 61/382,862, filed on Sep. 14, 2010, provisional application No. 61/420,100, filed on Dec. 6, 2010, provisional application No. 61/447,539, filed on Feb. 28, 2011, provisional application No. 61/491,058, filed on May 27, 2011.

(51) Int. Cl.
| C02F 1/56 | (2006.01) |
| C02F 1/28 | (2006.01) |
| C10G 1/00 | (2006.01) |
| C10G 1/04 | (2006.01) |
| E21B 21/06 | (2006.01) |
| C08F 220/06 | (2006.01) |
| C02F 103/10 | (2006.01) |

(52) U.S. Cl.
CPC . *C02F 1/56* (2013.01); *C02F 1/281* (2013.01); *C08F 220/06* (2013.01); *C10G 1/002* (2013.01); *C10G 1/047* (2013.01); *E21B 21/068* (2013.01); *C02F 2103/10* (2013.01)

(58) Field of Classification Search
None
See application file for complete search history.

(56) References Cited

U.S. PATENT DOCUMENTS

| 1,161,200 A | 11/1915 | de Brunn |
| 1,793,670 A | 2/1931 | Borrowman |
| 2,004,257 A | 6/1935 | Tschirner |
| 2,290,473 A | 7/1942 | Kalmar et al. |
| 2,581,186 A | 1/1952 | Green |
| 2,621,859 A | 12/1952 | Phillips |
| 2,678,168 A | 5/1954 | Phillips |
| 2,757,085 A | 7/1956 | Paquin |
| 2,902,399 A | 9/1959 | Paquin |
| 2,924,549 A | 2/1960 | Klein et al. |
| 3,080,264 A | 3/1963 | Zimmie et al. |
| 3,085,916 A | 4/1963 | Zimmie et al. |
| 3,090,567 A | 5/1963 | Schafer et al. |
| 3,365,520 A | 1/1968 | Foster et al. |
| 3,405,874 A | 10/1968 | Brizon |
| 3,487,003 A | 12/1969 | Baillie et al. |
| 3,488,720 A | 1/1970 | Nagy et al. |
| 3,502,575 A | 3/1970 | Hepp et al. |
| 3,642,501 A | 2/1972 | Minieri |
| 3,677,476 A | 7/1972 | Harned |
| 3,723,308 A | 3/1973 | Breck |
| 3,804,656 A | 4/1974 | Kaliski et al. |
| 3,816,080 A | 6/1974 | Bomford et al. |
| 3,835,046 A | 9/1974 | Restaino |
| 3,839,255 A | 10/1974 | Podlas |
| 3,917,538 A | 11/1975 | Rosensweig |
| 3,995,817 A | 12/1976 | Brociner |
| 4,032,466 A | 6/1977 | Otrhalek et al. |
| 4,065,544 A | 12/1977 | Hamling et al. |
| 4,175,117 A | 11/1979 | Hill |
| 4,180,508 A | 12/1979 | Becker et al. |
| 4,201,669 A | 5/1980 | Becker et al. |
| 4,213,874 A | 7/1980 | Williams et al. |

(Continued)

FOREIGN PATENT DOCUMENTS

| CA | 1 311 571 C | 12/1992 |
| CA | 2 085 188 A1 | 6/1993 |

(Continued)

OTHER PUBLICATIONS

Raju et al., Synthesis of novel superabsorbing copolymers for agricultural and horticultural applications, Polym. Int., 50:946-51 (2001).

(Continued)

Primary Examiner — Vu A Nguyen
(74) Attorney, Agent, or Firm — Marshall, Gerstein & Borun LLP

(57) ABSTRACT

The disclosure relates generally to the use of polymers to assist in aggregating mineral components in aqueous mineral slurries to release and separate individual components of the slurry, which may then be recovered from the slurry.

33 Claims, No Drawings

(56) References Cited

U.S. PATENT DOCUMENTS

| | | | |
|---|---|---|---|
| 4,305,781 A | 12/1981 | Langley et al. |
| 4,332,354 A | 6/1982 | deMonterey et al. |
| 4,343,706 A | 8/1982 | Etzel et al. |
| 4,348,369 A | 9/1982 | Hinchey et al. |
| 4,385,961 A | 5/1983 | Svending et al. |
| 4,388,150 A | 6/1983 | Sunden et al. |
| 4,405,483 A | 9/1983 | Kuzel et al. |
| 4,425,238 A | 1/1984 | Degen et al. |
| 4,486,314 A | 12/1984 | Koppelmann et al. |
| 4,529,794 A | 7/1985 | Sortwell et al. |
| 4,578,150 A | 3/1986 | Hou |
| 4,581,153 A | 4/1986 | Trabitzsch et al. |
| 4,624,418 A | 11/1986 | Szkaradek |
| 4,627,959 A | 12/1986 | Gilman et al. |
| 4,643,801 A | 2/1987 | Johnson |
| 4,647,304 A | 3/1987 | Petkovic-Luton et al. |
| 4,651,935 A | 3/1987 | Samosky et al. |
| 4,676,439 A | 6/1987 | Saito et al. |
| 4,753,710 A | 6/1988 | Langley et al. |
| 4,787,561 A | 11/1988 | Kemp, Jr. et al. |
| 4,795,531 A | 1/1989 | Sofia et al. |
| 4,800,071 A * | 1/1989 | Kaesler et al. ............ 423/321.1 |
| 4,812,299 A | 3/1989 | Wason |
| 4,844,355 A | 7/1989 | Kemp, Jr. et al. |
| 4,845,192 A | 7/1989 | Sortwell et al. |
| 4,892,590 A | 1/1990 | Gill et al. |
| 4,902,382 A | 2/1990 | Sakabe et al. |
| 4,913,361 A | 4/1990 | Reynolds |
| 4,927,498 A | 5/1990 | Rushmere |
| 4,954,220 A | 9/1990 | Rushmere |
| 4,964,954 A | 10/1990 | Johansson |
| 4,966,331 A | 10/1990 | Maier et al. |
| 4,969,976 A | 11/1990 | Reed |
| 4,980,025 A | 12/1990 | Andersson et al. |
| 5,015,334 A | 5/1991 | Derrick |
| 5,033,682 A | 7/1991 | Braun |
| 5,065,946 A | 11/1991 | Nishida et al. |
| 5,083,712 A | 1/1992 | Askew et al. |
| 5,085,705 A | 2/1992 | Witham |
| 5,112,388 A | 5/1992 | Schulz et al. |
| 5,147,449 A | 9/1992 | Grewe et al. |
| 5,171,808 A | 12/1992 | Ryles et al. |
| 5,176,891 A | 1/1993 | Rushmere |
| 5,185,206 A | 2/1993 | Rushmere |
| 5,221,435 A | 6/1993 | Smith, Jr. |
| 5,236,989 A | 8/1993 | Brown et al. |
| 5,240,561 A | 8/1993 | Kaliski |
| 5,270,076 A | 12/1993 | Evers |
| 5,312,595 A | 5/1994 | Moffett et al. |
| 5,320,284 A | 6/1994 | Nishida et al. |
| 5,320,773 A | 6/1994 | Perman et al. |
| 5,338,712 A | 8/1994 | MacMillan et al. |
| 5,350,437 A | 9/1994 | Watanabe et al. |
| 5,374,335 A | 12/1994 | Lindgren et al. |
| 5,393,436 A | 2/1995 | Nagan |
| 5,470,435 A | 11/1995 | Rushmere et al. |
| 5,473,033 A | 12/1995 | Kuo et al. |
| 5,482,693 A | 1/1996 | Rushmere et al. |
| 5,487,882 A | 1/1996 | Hu et al. |
| 5,501,774 A | 3/1996 | Burke |
| 5,503,820 A | 4/1996 | Moffett et al. |
| 5,514,249 A | 5/1996 | Cauley et al. |
| 5,543,014 A | 8/1996 | Rushmere et al. |
| 5,560,829 A | 10/1996 | Adams et al. |
| 5,584,966 A | 12/1996 | Moffett |
| 5,591,256 A | 1/1997 | Freeman et al. |
| 5,595,630 A | 1/1997 | Moffett |
| 5,596,630 A | 1/1997 | Lin et al. |
| 5,662,826 A | 9/1997 | Nilsson et al. |
| 5,676,796 A | 10/1997 | Cutts |
| 5,681,480 A | 10/1997 | Langley et al. |
| 5,704,556 A | 1/1998 | McLaughlin |
| 5,863,516 A | 1/1999 | Otterstedt et al. |
| 5,882,625 A | 3/1999 | Mac Dougall et al. |
| 5,900,116 A | 5/1999 | Nagan |
| 5,919,882 A | 7/1999 | Ryles et al. |
| 5,935,425 A | 8/1999 | Sortwell |
| 5,968,316 A | 10/1999 | McLauglin et al. |
| 6,183,600 B1 | 2/2001 | Nagan |
| 6,190,561 B1 | 2/2001 | Nagan |
| 6,265,477 B1 | 7/2001 | Hurlock |
| 6,447,686 B1 | 9/2002 | Choi et al. |
| 7,824,570 B2 | 11/2010 | Polak et al. |
| 7,901,583 B2 | 3/2011 | McColl et al. |
| 2002/0188040 A1 | 12/2002 | Chen et al. |
| 2004/0110861 A1 | 6/2004 | Shorbu et al. |
| 2004/0154988 A1 | 8/2004 | Sheets |
| 2005/0159319 A1 | 7/2005 | Eoff et al. |
| 2006/0207946 A1 | 9/2006 | McColl et al. |
| 2010/0098493 A1 | 4/2010 | McColl et al. |
| 2010/0187181 A1 | 7/2010 | Sortwell |

FOREIGN PATENT DOCUMENTS

| | | |
|---|---|---|
| CA | 2 130 587 A1 | 2/1996 |
| CA | 2 290 473 A1 | 11/1998 |
| CA | 2 370 484 A1 | 11/2000 |
| CA | 2 378 131 A1 | 3/2001 |
| CA | 2378850 A1 | 3/2001 |
| CA | 2 515 581 A1 | 7/2004 |
| CA | 2 535 702 A1 | 3/2005 |
| CA | 2 558 038 A1 | 10/2005 |
| CA | 2 558 092 A1 | 10/2005 |
| CA | 2 558 143 A1 | 10/2005 |
| CA | 2 595 723 A1 | 4/2007 |
| CA | 2 625 798 A1 | 5/2007 |
| CA | 2 658 780 A1 | 2/2008 |
| CA | 2 667 277 A1 | 9/2008 |
| CA | 2 667 281 A1 | 9/2008 |
| CA | 2 677 846 A1 | 9/2008 |
| CA | 2 679 356 A1 | 9/2008 |
| CA | 2 690 866 A1 | 12/2008 |
| CA | 2 704 741 A1 | 4/2009 |
| CA | 2703601 A1 | 4/2009 |
| CA | 2 665 350 A1 | 12/2009 |
| CA | 2 682 542 A1 | 4/2010 |
| CA | 2 684 155 A1 | 4/2010 |
| CA | 2 667 933 A1 | 7/2010 |
| CA | 2 666 025 A1 | 11/2010 |
| CA | 2 701 317 A1 | 3/2011 |
| CN | 1036910 A | 11/1989 |
| CN | 1826160 A | 8/2006 |
| EP | 0 551 061 A1 | 7/1993 |
| EP | 0 620 190 A1 | 10/1994 |
| JP | 5-5104658 A | 8/1980 |
| SU | 958 651 A1 | 9/1982 |
| SU | 1507443 A2 | 9/1989 |
| WO | WO-92/00247 A1 | 1/1992 |
| WO | WO-96/05139 A1 | 2/1996 |
| WO | WO-96/05146 A1 | 2/1996 |
| WO | WO-96/17688 A1 | 6/1996 |
| WO | WO-01/92167 A1 | 12/2001 |
| WO | WO-2004/049787 A2 | 6/2004 |
| WO | WO-2004/060819 A1 | 7/2004 |
| WO | WO-2005/075362 A1 | 8/2005 |
| WO | WO-2006/133262 A2 | 12/2006 |
| WO | WO-2009/153424 A1 | 12/2009 |
| WO | WO-2010/088388 A1 | 8/2010 |
| WO | WO-2012/018514 A2 | 2/2012 |
| WO | WO-2012/088291 A1 | 6/2012 |

OTHER PUBLICATIONS

Gronowski et al., Copolymerization of styrene with magnesium, calcium, strontium, and barium acrylates in dimethyl sulfoxide, Makromol. Chem., 190:2063-9 (1989).

Examination Report issued in corresponding Canadian patent application No. 2,803,904 (Apr. 19, 2013).

Examination Report from Canadian patent application No. CA 2,803,025, issued May 2, 2013.

Canadian Notice of Allowance for Application No. 2,667,933, dated Jul. 20, 2011.

(56) References Cited

OTHER PUBLICATIONS

Canadian Office Action for Application No. 2,667,933, dated Sep. 27, 2010.
Colloidal Silica-Concentrated Sols. (Date Unknown), pp. 407-410.
Cotton, F. Alberto and Wilkinson, Geoffrey, Advanced Inorganic Chemistry. (John Wiley & Sons, 1980) pp. 389-392.
Hopkins, "Acrylate Salts of Divalent Metals," *Industrial and Engineering Chemistry*, 47(11):2258-2265 (1955).
International Preliminary Examination Report for Application No. PCT/US98/09919, dated Oct. 19, 1998.
International Preliminary Report on Patentability for Application No. PCT/US2010/022406, dated Aug. 2, 2011.
International Preliminary Report on Patentability for Application No. PCT/US2011/044437, dated Oct. 24, 2012.
International Search Report and Written Opinion for Application No. PCT/US2010/022406, dated May 6, 2010.
International Search Report and Written Opinion for Application No. PCT/US2011/044437, dated Jan. 30, 2012.
Junaid et al., "Natural Zeolite Catalyzed Cracking-Assisted Light Hydrocarbon Extraction of Bitumen from Athabasca Oilsands," *Applied Catalysis A*, 354(1-2):44-49 (2008).
Kirk-Othmer Encyclopedia of Chemical Technology. (1995 ed.), vol. 16, pp. 888-925.
Kuznicki et al., "Natural Zeolite Bitumen Cracking and Upgrading," *Microporous and Mesoporous Materials*, 105(3):268-272 (2007).
Lambe et al., "Altering Solil Properties with Chemicals," *Chemical and Engineering News*, 32(6): 488-492 (1954).
McGraw-Hill Encyclopedia of Chemistry. (McGraw-Hill Book Co., 1983) p. 618.
Meunier et al., "Soil-Water Relationships in Calcium Acrylate Stabilized Soil," *Industrial and Engineering Chemistry*, 47(11):2265-2269 (1955).
Moffett, Robert H., On-site production of a silica-based microparticulate retention and drainage aid. Tappi Journal, vol. 77, No. 12 (Dec. 1994), pp. 133-138.
Non-Transition Elements. (Date Unknown), pp. 472-474.
Podkuiko et al., "Synthesis and Flocculating Power of Calcium-Containing Polyacrylate," *Russian Journal of Applied Chemistry*, 77(4):685-687 (2004).
Pummer, von H., Selektive Fullstoffretention and optische Eigenschaften des Papiers. (1973) pp. 417-422.
Response to Canadian Office Action, filed Mar. 23, 2011.
Sneed, M. Cannon and Maynard, J. Lewis, General Inorganic Chemistry. (D. Van Norstrand Co., Inc., 1943) pp. 711-713.
Van Olphen, H, An Introduction to Clay Colloid Chemistry. (John Wiley & Sons, Date Unknown), pp. 57-68.
International Search Report and Written Opinion for International Application No. PCT/US13/22459, mailing date Apr. 1, 2013.
Search Report in European Application No. 13740613.8 dated Jul. 6, 2015.
Office Action in CN Application No. 201380006566.9 dated Jun. 24, 2015.

\* cited by examiner

METHOD FOR DISPERSING AND AGGREGATING COMPONENTS OF MINERAL SLURRIES AND HIGH-MOLECULAR WEIGHT MULTIVALENT POLYMERS FOR CLAY AGGREGATION

BACKGROUND OF THE INVENTION

1. Field of the Invention

The invention relates generally to polymers and the use of thereof to assist in aggregating mineral components in aqueous mineral slurries to release and separate individual components of the slurry, which may then be recovered from the slurry.

2. Related Technology

Many industrial processes involve the dispersion of minerals in water to assist in the separation and recovery of mineral or other components. The mining industry is the predominant user of such processes, wherein mineral ores are ground and slurried in water to allow separation and recovery of desired components. The residual mineral components in the slurry, referred to as gangue or tailings, are then often deposited in pits or ponds, often called tailings ponds, where solids are expected to settle to allow recovery of the supernatant water, and ultimate consolidation of the remaining mineral solids. Coal, copper, and gold mining are but a few of the mining processes that employ this technology.

The slow rate of mineral solids settling in tailings ponds is often a serious economic and environmental problem in mining operations. If an objective of such processes is to recover water for reuse or disposal, lengthy pond residence times, often measured in years, can cripple process economics. Further, huge volumes of ponded slurry can be environmentally and physically dangerous. Dike failures of coal slurry ponds in the United States attest to both these dangers.

If the ponded slurry is predominantly composed of coarse minerals, the settling rate in tailings ponds is not generally an environmental or economic problem. In this instance, solids settle quickly and consolidate to disposable consistencies, and water is easily recovered. But when components of the ponded slurry are very fine materials, settling is often hindered and, in some instances, may take years to occur.

A major undesired component of many mineral slurries is often clay. Clays have a variety of chemical compositions but a key difference in how a clay behaves in a mineral slurry is whether it is predominantly in a monovalent (usually sodium) form or in a multivalent (usually calcium) form. The effects of the varying chemical compositions of clays are well known to those in industry. Monovalent clays tend to be water-swelling and dispersive, multivalent clays generally are not.

Water-swelling and dispersive clays cause many of the problems in mineral processing and tailings dewatering. These clays tend to be monovalent, sodium clays, such as bentonite, which is largely composed of montmorillonite. These clays can be expressed as $Na.Al_2SO_3.4SiO_2.H_2O$.

Further, if the clays are very finely divided, the problem is often magnified. If the clay particles are easily broken down to even finer particles through shearing in processing, problems can be compounded. Layered, platelet, or shale-like forms of clay are particularly sensitive to mechanical breakdown to even finer particles during processing.

In mineral processing, additives are often used to facilitate removal of specific components. Frothers used to separate and float ground coal particles are an example of this. In this instance, the desired component to be recovered is an organic material such as coal, but similar processes are used for mineral recoveries. In almost all mining processes the remaining slurry must be separated to recover water and consolidated solids.

Since the late 1960s, a new mining industry has been operating in the northeast of the Canadian province of Alberta. The deposits being mined are referred to as the Athabaska oil sands. The deposits are formed from a heavy hydrocarbon oil (called bitumen), sand, clay, and water. In processing the deposit, the ore is slurried in warm or hot water with the objective of separating the bitumen from the sand and clay, recovering the bitumen by flotation, recovering the water for reuse, and disposing of the dewatered residual mineral solids in site reclamation. The oil sand deposits contain the second largest quantity of oil in the world, second only to Saudi Arabia's. Consequently, separation, water recovery, and solids disposal are carried out on an industrial scale never before seen.

The first objective in oil sands processing is to maximize bitumen recovery. Slurrying in warm or hot water tends to release bitumen from the minerals in the ore, in a pipeline process called hydrotransport, while the slurry is transported via pipeline to a primary separation unit. Various chemical additives, including caustic soda or sodium citrate, have been used to improve dispersion of the ore's components into the process water and to accelerate separation of the bitumen from the sand and clay for greater bitumen recovery. In the hydrotransport process, sand is relatively easily stripped of bitumen and readily drops out and is removed through the bottom of the primary separation unit; the clays are the principal problem. Clays, associated with divalent or other multivalent cations, particularly calcium and magnesium, contributed by, for example, process waters are recognized to deter efficient separation and flotation of the bitumen. The use of additives such as caustic soda or sodium citrate aid in the dispersion to inhibit clay's deleterious effects. Sodium citrate is a known dispersant and also acts as a water-softening agent, to sequester calcium and magnesium ions.

While improving recovery, these additives often have residual negative effects following bitumen separation by inhibiting subsequent water removal from the clay. A great deal of research has gone into studying the various types of clays found in the oil sands deposits. Different clays affect bitumen separation differently, often in ways not completely understood, and differences in the clays affect the clays' subsequent separation from the process water. Since ore is a natural deposit, the separation process is at the mercy of clay type and content, and the level of divalent ions. Pump and pipeline shear acting on the slurry break down clay into finer clay particles to further negatively affect the separation process. Various ore sources are often blended prior to hydrotransport in an attempt to mitigate the effects of clays. Compressed air may be introduced into the hydrotransport pipeline. The air dissolves under pressure and, as pressure is released ahead of the primary separation vessel, bubbles form to help float the bitumen.

In the separation process, the floated bitumen overflows to further processing. Typically, the sand and any coarse clays settle quickly into the base of a conical primary separation unit. The withdrawal rate of this coarse segment can be controlled. The largest volumetric component, called middlings, is the middle stratum above the coarse layer and below the bitumen float. The middlings consist of a dispersion of the fine clays. The industry considers these fine clays to be any size less than 44 microns in diameter. These clays usually form a very stable dispersion. Any dispersive additives further increase the stability of the clay slurry. If the dispersant, or any other additive, increases middlings viscosity in the primary separation unit, then bitumen flotation and recovery may be hindered.

In existing processes, the conditions that promote efficient dispersion and bitumen recovery appear to be diametrically opposed to the conditions that subsequently promote downstream fine clay separation, solids consolidation, and water recovery. The longer it takes to recover and reuse the process water, the more heat and evaporative losses occur. The tradeoff between efficient bitumen extraction and downstream disposal of mineral solids is an expensive problem for the oil sands industry.

In the extraction process, middlings are continuously withdrawn from the center of the primary separation unit. Both the heavy, easily settled sand/coarse clay component, withdrawn from the conical bottom of the primary separation unit, and the middlings component are usually subjected to additional cleaning and mechanical dewatering steps to recover any bitumen that is not floated off in the primary separation unit. The middlings may be hydrocycloned to increase density. The middlings then generally report to a thickener, where high molecular weight sodium/potassium/ammonium-acrylate/acrylamide-based copolymers (called flocculants) are added to coagulate and flocculate the dispersed middlings' fine clays. Four to five hours of residence time are generally required in the thickener to produce a thickened underflow (to begin to increase clay solids for use in final solids consolidation) and to produce clarified overflow water for reuse in the process. Thickeners are immense, expensive mechanical separators with massive holding volumes.

The final objective of the oil sands process is to produce dense, trafficable solids for site reclamation and to recover water for process use. The two mineral process streams, sand/coarse clay from the primary separation unit, and middlings (often thickened as described above) are either pumped to separate containment areas (called ponds) or are combined and then sent to ponds. Both approaches have created problems, with which the industry is grappling. The combined streams (called combined tailings, or CT) have produced a condition wherein the coarse sand and clays have settled relatively quickly in the ponds, but the fine clays have not. Instead of the desired settling and recovery of supernatant water, the upper layer in these ponds forms an almost permanent layer of suspended fine clays, referred to as mature fine tails (MFT). The clay content in this relatively fluid, almost permanent layer of MFT generally ranges from 40 wt % to 50 wt % solids. When the middlings are pumped separately to ponds, the same condition is immediately created. The existence and size of these ponds threaten the very future of the industry. Government has ordered that these ponds of MFT must be re-processed, water recovered for reuse, and dewatered solids consolidated to restore the mined sites.

The oil sands industry has made a concerted effort to reprocess the MFT into what are called non-segregating tailings (NST). By this is meant sand and clay tailings of varying particle sizes that, when pumped to ponds, do not segregate by particle size upon settling but, rather, settle in a non-segregating manner, more quickly releasing supernatant and/or underflow drainage waters, and ultimately producing a trafficable solid that can be used for mine site restoration. Heat is still lost after the NST slurry is pumped to ponds and the warm water still evaporates. Any method or procedure that could recover more warm water within the operating process, and that could produce easily-dewatered, non-segregating tailings immediately after the separation process, would be of great benefit to the oil sands industry.

In Nagan U.S. Pat. No. 6,190,561 and its counterpart Canadian Patent No. 2,290,473, the entire respective disclosures of which are incorporated herein by reference, Nagan describes a process using "zeolite crystalloid coagulants (ZCC)" as a method of water clarification. This sodium or potassium zeolite, referred to in the patent as ZCC, is used in a specific sequence to coagulate solid particles and separate them from an aqueous dispersion. The specified sequence comprises, first, providing an aqueous suspension of particulate matter containing (and maintaining) multivalent cations (and optionally adding additional multivalent cations, such as cationic polyacrylamide), then adding a zeolite crystalloid coagulant in sufficient amount to effect coagulation of the particulate matter by ion exchange between said adsorbed cations and the sodium or potassium present in the ZCC. This specific sequence is very effective in coagulating the cationic solids.

In the '561 and '473 patents, Nagan describes the procedure for producing this type A zeolite by reacting sodium aluminate and either sodium or potassium silicate, relatively inexpensive and commercially available chemicals. Both sodium silicate and sodium aluminate are available as bulk liquids.

SUMMARY OF THE INVENTION

The invention is directed to overcoming at least one of the problems associated with the separation of components within an aqueous mineral slurry, the recovery of specific components from the slurry, and subsequent dewatering and disposal of the residual mineral slurry.

Accordingly, the invention provides a method and polymer for treatment of aqueous dispersions of components of a solid mineral-containing slurry, particularly wherein one or more clay and/or the chemical components of clay(s), or other minerals, inhibit (a) initial dispersion and separation of the mineral components and any organic components and/or (b) following separation of the desired components, the clay(s) (or other minerals) form stable suspensions that resist dewatering.

The invention is particularly applicable for use with slurries containing swellable sodium clays such as bentonite/montmorillonite clays, such as those expressed as $Na.Al_2SO_3.4SiO_2.H_2O$.

According to the invention, a polymer, which is a multivalent cation-containing acrylate copolymer with a monomer such as acrylamide. The copolymer may be a terpolymer containing a multivalent cation-containing acrylate with a monomer such as acrylamide and a third monomer such as AMPS (2-acrylamido-2-methylpropane sulfonic acid). The polymer is produced and added in water solution to a mineral-containing slurry to cause the solid mineral components to immediately begin to aggregate and settle to form a product comprising a solid aggregated floc and supernatant water, thereby enhancing separation and subsequent recovery of solid mineral components of the mineral slurry and enhancing subsequent water removal and consolidation of residual components of the product. As used herein, the term "copolymer" denotes polymers including two or more different monomer units, and therefore is inclusive of terpolymers, for example.

The multivalent acrylate polymer or multivalent acrylate copolymer is either in the form of a dry granular solid manufactured via solution polymerization, or in the form of an invert emulsion, wherein the polymerization takes place in the emulsion. In both instances the polymers are completely water soluble, the polymer molecules being linear or deliberately lightly cross-linked.

The molecular weight of the polymer is preferably sufficiently high that the polymer acts as a flocculant on the clays in a slurry, and that the polymer exhibits an intrinsic viscosity of at least 3 dl/gm and has a molecular weight greater than four million.

In one embodiment of the invention, a solution of the multivalent acrylate polymer or copolymer is added to the mineral slurry to flocculate the solid mineral components of the mineral slurry.

In another embodiment of the invention, a zeolite, preferably in an aqueous solution or dispersion, is added to the aqueous mineral slurry. The multivalent acrylate polymer or copolymer is then added in sufficient amount to react with the zeolite to immediately neutralize the dispersive effect of the zeolite to cause the mineral and other solid components to aggregate and settle.

In either embodiment of the process, a cationic coagulant or cationic flocculant, both in solution form, may optionally be added to the product to improve or strengthen the floc and/or to improve the clarity of the supernatant water, but no precipitant such as inorganic calcium ions is required.

When the multivalent acrylate polymer is added, either with or without prior ZCC addition, the multivalent acrylate polymer instantly causes aggregation and settling of solid components. The fine clays or other fine components immediately begin to visually aggregate and settle. In this instance the term "aggregate" is used to differentiate this observed mechanism from more conventional flocculation or even coagulation mechanisms. The aggregating particles visually grow in a unique way, producing a discrete, coarse, rapidly-settling aggregate. Finally, if the coarse underflow (from what would be the primary separation unit in the oil sands process) is combined with the now aggregated middlings, the resultant combined slurry can be treated with low levels of additional cationic coagulant and/or cationic flocculants to produce non-segregating tailings (known as "NST" in the art). These non-segregating tailings dewater quickly, providing accelerated supernatant and/or underflow water recovery.

Other objects and advantages of the invention will be apparent to those skilled in the art from a review of the following detailed description, taken in conjunction with the appended claims.

DETAILED DESCRIPTION

Accordingly, the invention provides a method to enhance dewatering of the solids in a mineral slurry for water recovery and solids reclamation, the method comprising:

(a) providing an aqueous slurry comprising slurrying water and solid mineral components;

(b) optionally adding to the slurry of (a) a sodium or potassium zeolite having a weight ratio of aluminum to silicon in the range of about 0.72:1 to about 1.3:1 in an amount sufficient to disperse and separate the components of the slurry to form a dispersed slurry;

(c1) adding to the dispersed slurry of (a) sufficient quantities of a solution of a polymer selected from the group consisting of multivalent cation-containing acrylate homopolymers and multivalent cation-containing acrylate copolymers to react with the solid mineral components of (a) to cause the solid mineral components to immediately begin to floc and settle to form a product comprising a floc and supernatant water, thereby enhancing separation and subsequent recovery of solid mineral components of the slurry and enhancing subsequent water removal and consolidation of residual components of the product; or (c2) adding to the dispersed slurry of (b) sufficient quantities of a solution of a polymer selected from the group consisting of multivalent cation-containing acrylate homopolymers and multivalent cation-containing acrylate copolymers to react with the zeolite to immediately neutralize the dispersive effect of the zeolite in (b) to cause the solid mineral components to immediately begin to aggregate and settle to form a product comprising a flocced aggregate and supernatant water, thereby enhancing separation and subsequent recovery of solid mineral components of the slurry and enhancing subsequent water removal and consolidation of residual components of the product; and, (d) optionally adding to the product of (c1) or (c2) a cationic coagulant or cationic flocculant to improve the floc and/or to improve the clarity of the supernatant water.

Preferably, the clay is a swellable, sodium clay such as bentonite/montmorillonite, such as those expressed as $Na.Al_2SO_3.4SiO_2.H_2O$.

Preferably, the multivalent cations of the acrylate monomer are selected from the group consisting of calcium, magnesium, iron, and aluminum.

The polymer preferably is a calcium or magnesium-containing diacrylate homopolymer, or a copolymer of the divalent acrylate with acrylamide, or a terpolymer of divalent acrylate, acrylamide, and AMPS (2-acrylamido-2-methylpropane sulfonic acid).

The multivalent acrylate polymer or multivalent acrylate copolymer is either in the form of a dry granular solid manufactured via solution polymerization, or in the form of an invert emulsion, wherein the polymerization takes place in the emulsion. In both instances the polymers are completely water soluble, the polymer molecules being linear or only lightly cross-linked.

The molecular weight of the polymer is preferably sufficiently high so that the polymer functions as an aggregant and has an intrinsic viscosity of at least 3 dl/gm and a molecular weight greater than four million.

A solution of the water-soluble polymer is used at a dosage sufficient to flocculate the mineral components and any organic components. An effective dosage range of the aggregant is between 100 and 2000 grams (and preferably 600 grams or less) of aggregant/ton of clay fines.

In a preferred embodiment, separation and subsequent recovery of solid mineral components of the slurry and subsequent water removal and consolidation of residual components of the slurry may be enhanced by adding sand to the product of (c1) or (c2).

In one preferred embodiment, the polymer is a calcium diacrylate/acrylamide copolymer or a calcium diacrylate/acrylamide/2-acrylamido-2-methylpropane sulfonic acid (AMPS) terpolymer having an intrinsic viscosity of at least 3 dl/gm and a molecular weight of greater than four million, highly preferably with a calcium diacrylate content in the range of at least 5 mole %. In one form of this embodiment, performance can be enhanced by applying controlled mechanical shear to a solution of the polymer sufficient to reduce the breadth of the molecular weight distribution and/or to reduce the solution viscosity to provide a polymer solution that more easily mixes with viscous or dense substrates to enhance performance of the polymer.

Preferably, the polymer solution is substantially free of monovalent cation-containing acrylate polymers, and highly preferably only a single species of multivalent cation selected from the group consisting of calcium, magnesium, iron, and aluminum is present in the polymer solution.

Each of the substantial absence of monovalent cations and the presence of only a single species of multivalent cation contributes to high specificity of the polymer for the mineral components of the slurry, particularly in the case of clays.

The high molecular weight anionic moiety of the polymer of the invention may be a copolymer of a multivalent salt of an organic acid (such as calcium, magnesium, iron, or aluminum acrylates) with acrylamide, or even a terpolymer of these organic monomers such as 2-acrylamido-2-methylpropane sulfonic acid (AMPS). The common denominator of these polymeric aggregants is that they contain multivalent acrylic salts and that the polymers produced are essentially linear in nature, meaning that the long-chain molecules formed during polymerization are essentially one-dimensional, each long-chain molecule having substantial length but insubstantial breadth (unless heavily cross-linked). These long-chain molecules, particularly when they are millions of "mer" units long, may be physically tangled when in aqueous solution, but such tangling does not detract from the essentially linear nature of the polymers.

The linear nature of a polymer, such as described above, may be modified by very slight cross-linking to produce a degree of two-dimensionality in the polymer. This slight cross-linking to a two-dimensional structure is referred to as "branching."

On the high molecular weight anionic copolymers of multivalent acrylates of the invention, branching may be induced by the addition of any suitable additional cross-linker monomer, such as methylene-bis-acrylamide (MBA), for example (as shown in Example 2, below). MBA is essentially two acrylamide molecules non-linearly bridged by a methyl group. The level of cross-linking monomer that is required to achieve branching is low, typically in the range of 0.1 ppm (preferably at least 0.5 ppm) to 10 ppm (preferably 5 ppm or less) based on total monomer(s). Branching with these low levels of cross-linker induces a very low level of insolubility when the multivalent copolymer of the invention is dissolved in water.

Lower solution viscosities are particularly advantageous when the mineral stream to be treated is either very dense or very viscous, or both. The lower the solution viscosity of the aggregant, the more thoroughly the polymer molecules can contact the individual mineral solids. If less mixing energy is required to achieve this particle contact, there is less energy applied that can simultaneously shear the polymeric structure being produced. The controlled mechanical shearing of the polymer previously described is additionally beneficial in achieving particle contact, resulting in more robust solids generation and faster water release from the solids. The closer the mixing regime can come to instantaneous mixing, but with sufficient shear/mixing energy to maximize polymer-to-clay-particle contact, the less aggregate destruction will occur as a result of recirculation mixing.

Slight branching of the calcium diacrylate copolymer (or other multivalent cation-containing acrylate copolymer) of the invention further improves the performance of the linear diacrylate copolymer in aggregating mineral fines, releasing cleaner water, and releasing the water more quickly. The aggregated structure formed with the slightly branched calcium diacrylate copolymer produces a more robust, shear-resistant solids.

One preferred embodiment of the inventive method comprises adding the zeolite of (b) to the slurry of (a) in the form of a solution prepared by a method comprising admixing an aqueous solution of sodium silicate or potassium silicate with an aqueous solution of sodium aluminate to form a reaction mixture, and immediately diluting the reaction mixture to a zeolite concentration of about 0.5 wt % or less to effectively terminate the reaction and to stabilize the product. Highly preferably in this embodiment, the respective concentration of each of said sodium silicate or potassium silicate solutions and the sodium aluminate solution in the reaction mixture is greater than 1.5 wt %. More highly preferably, the sodium silicate has an $SiO_2/Na_2O$ weight ratio of about 1.8:1 to about 3.25:1, more preferably about 2.58:1, and most preferably wherein the zeolite has an Al/Si weight ratio of about 1:1.

In a highly preferred embodiment, the slurry of (a) contains clay, typically a sodium clay, and the polymer is a calcium- or magnesium-containing diacrylate copolymer, most preferably a diacrylate/acrylamide copolymer or a diacrylate/acrylamide/2-acrylamido-2-methylpropane sulfonic acid (AMPS) terpolymer.

In some embodiments, the slurry of (a) contains organic materials, and/or the solid mineral components comprise particles 44 microns or less in size.

In some embodiments, the solid components comprise a mineral ore and the slurry may contain bitumen, and in oil sands applications the slurry typically contains sand, clay, residual bitumen, and water.

One embodiment of the invention utilizes zeolite produced by the reaction of sodium aluminate with either sodium silicate or potassium silicate. These inorganic reagents are commercially available in aqueous solution form, easily diluted with water and reacted to form a type A (ion exchange) zeolite as described by Nagan. Nagan teaches the use of zeolite particles of at least 4 nm in diameter for use as a coagulant. Four nanometers is generally recognized to be the particle size at which opalescence may be observed and the point at which discrete particles are formed.

A functional dispersing zeolite according to the invention can be formed as a solution, in a virtual instantaneous reaction of aluminate and silicate. This greatly simplifies production of zeolite by reducing the control parameters needed for on-site production of zeolite. The instantly-reacted zeolite responds to the subsequent addition of multivalent ions and/or cationic flocculant in a similar manner to the larger zeolite particles of 4 nm to 100 nm described by Nagan, all of which sizes function as dispersants and subsequent reactants in this invention.

Further, hardness-containing water (in this instance, water containing 40 ppm calcium and 10 ppm magnesium, both expressed as the carbonates) can be used to produce and dilute the zeolite to a working solution/dispersion.

This invention applies particularly well to processing of ores containing water-swellable clays or other minerals and, typically, organic materials that respond to the dispersive effects of the zeolite.

In one embodiment, the zeolite of (b) (see above), is added in the form of a solution prepared by a method comprising admixing an aqueous solution of sodium silicate or potassium silicate with an aqueous solution of sodium aluminate to form a reaction mixture, and immediately diluting the reaction mixture to a zeolite concentration of about 0.5 wt. wt % or less to terminate the reaction and to stabilize the product. In this embodiment, the respective concentration of each of said sodium silicate or potassium silicate solutions and said sodium aluminate solution in the reaction mixture is preferably greater than 1.5 wt. wt %. Also, in this embodiment the sodium silicate preferably has an $SiO_2/Na_2O$ weight ratio of about 1.8:1 to about 3.25:1, and highly preferably, the sodium silicate has an $SiO_2/Na_2O$ weight ratio of about 2.58:1.

In one preferred embodiment, the zeolite has an Al/Si weight ratio of about 1:1.

The zeolite used in the invention may exist and be used either as a solution or as discrete particles of diameters, typically with diameters up to 100 nanometers.

In various embodiments of the test of the invention, the slurry contains at least one water-swellable clay or other solid mineral components, and typically will also contain organic materials. Often, clay fines and other solid components comprise, consist essentially of, or consist of solid particles 44 microns or less in size.

The invention also provides formulations to produce high molecular weight water-soluble copolymer produced from multivalent calcium diacrylate monomers.

EXAMPLES

The performance of the method and polymers of the invention is further described and illustrated by the following detailed examples, which are not intended to be limiting.

Example 1

Preparation of a Linear Gel Polymer

A linear gel polymer comprising 65 wt. % calcium acrylate was prepared from the following reagents:

| Reagent | Weight % |
| --- | --- |
| Calcium diacrylate | 15.6 |
| Acrylamide | 8.4 |
| Demineralized water | 75.9976 |
| Ammonium persulfate | 0.0009 |
| Sodium bisulfate | 0.0014 |
| 2.2:azobis (2-amidinopropane) dihydrochloride | 0.0001 |

The pH was adjusted to 6.5 with HCl before initiation of the reaction, and the reagents were deaerated with $N_2$ and the reaction was initiated at 9° C. and carried to completion, resulting in a linear calcium diacrylate copolymer with an intrinsic viscosity of 18 dl/gm.

Example 2

Preparation of a Branched Gel Polymer

The formulation and reaction conditions were identical to those of Example 1, except for the addition of 0.000025% methylene bis acrylamide (MBA) monomer to produce a slightly-branched calcium diacrylate copolymer.

Example 3

Aggregation Testing

Both polymers were dried and ground. The linear polymer had a molecular weight of approximately 23 million. A 0.1% active aqueous solution of each polymer was applied separately at 450 g active polymer to 10% solids clay (predominately sodium clays) slurries in water. Both of these calcium diacrylate products immediately aggregated and precipitated the clay fines into coarse solids, with the slightly-branched formulation producing the coarser aggregate. Both of these formulations produced more distinct and faster settling solids when compared to monovalent (sodium) acrylate/acrylamide polymer (flocculant) of similar molecular weight. The aggregated deposits according to the invention were more stable to additional shearing than the deposit produced by the sodium acrylate-based copolymer.

Example 3

Flocculating and Dewatering without Utilizing Zeolites

In this example, a 0.4 weight % solution of the high molecular weight, slightly branched calcium diacrylate/acrylamide copolymer aggregant of Example 2 (intrinsic viscosity 18 dl/g with an approximate molecular weight of 23 million) was subjected to momentary mechanical shear to effectively reduce the high molecular weight tail of the molecule to improve performance. The solution was applied to a slurry of <44 micron fines from the extraction stage of oil sands ore processing, combined with sand to give a 1:1 sand to fines weight ratio. The dosage was 0.583 kg flocculant per ton fines. A strong aggregate was formed that free-drained and drained under compression to form a solid. In a further test, the same sheared 0.5 weight % solution of polymer as above was applied to a slurry of <44 micron fines from a tailings pond, combined with sand to give a 2:1 sand to fines ratio. The dosage was 0.498 kg/ton fines. A strong aggregate was formed that free-drained and drained under compression to form a solid. In an extension of this test, following the addition of the calcium diacrylate/acrylamide copolymer, a similarly sheared high molecular weight cationic flocculant was added to the slurry at a dosage of 0.405 kg per ton fines. Drainage rate and drained water clarity were improved by this secondary flocculant addition.

The 65 wt. % calcium diacrylate copolymer with an intrinsic viscosity of 18 dl/gm was of the same molecular weight range as conventional sodium acrylate copolymer flocculants used in clay treatment.

Example 4

Aggregating and Dewatering Utilizing Zeolites

Mining processes produce aqueous mineral waste streams called tailings. A major component of these slurries is often clay. Many times these clays are of micron-sized particles such that slurries of these clays resist separation and settling from the water, often for decades. Water, which should be reclaimed, is thereby virtually permanently tied up in these slurries and is not available for reuse. Further, in surface mining operations, the clay solids are then not available to restore the mine site.

The problem described above is particularly serious in the surface mining and processing of oil sands in the Canadian province of Alberta. Process applications to resolve some of these problems are described in Canadian Patent Application 2,667,933 and International Patent Application PCT/US10/22406, the entire respective disclosures of which are incorporated herein by reference.

In both of these patent applications the technology involves the reaction of pico/nano-sized, in-situ-generated sodium zeolite particles that are added to the clay-containing slurry. The zeolite particles react with, or affix themselves to, the fine clay particles (in an as yet a not fully understood manner). The clay slurry is further stabilized by this treatment.

Increased stability of the clay-containing slurry, while possibly useful at certain stages of processing, is not permanently desirable. After the treatment with the sodium zeolite, the technology calls for the application of a multivalent cation source, preferably in the form of divalent cations such as $Ca^{++}$ or $Mg^{++}$, usually added in the form of an aqueous solution of calcium chloride or magnesium sulfate. The divalent cations ion exchange with the sodium on the zeolite attached to the clay particles and in so doing destabilize the dispersive nature of the clay, causing the clays to aggregate into larger particles that separate easily from the water. The growth to aggregated particles is clearly seen by scanning electron microscope. When the clay is mixed with sand in a ratio of 3-to-5:1 clay, and treated with a flocculant, an easily dewatered dense solid can be produced.

At this point a very desirable result has been achieved. Clay/sand solids can be separated for disposal and water can be reclaimed for re-use. However, the reclaimed water contains the inorganic anion component of the divalent salt. It would be desirable not to contribute such anions to the reclaimed water.

The following illustrates one approach to addressing this problem.

Synthetic flocculants, polymerized from acrylamide and/or acrylic acid monomer, are widely used in water clarification. The acrylic acid component is usually converted to a monovalent salt, e.g., sodium acrylate, before polymerization (either singly to produce the homopolymer, or in combination with acrylamide). 43% clay slurry from an oil sands tailings pond (called mature fine tails, or MFT, by the industry) was diluted to 21% clay solids and treated with sodium zeolite at 2.43 kg per ton zeolite active per ton of fines (in a blend of 2:1 sand to fines ratio). Instead of treating the zeolite-treated MFT/sand slurry with magnesium sulfate to destabilize and aggregate the clay in the fines/sand mixture, a solution of calcium diacrylate copolymer at 0.375 kg per ton fines was applied. The result was large aggregates of clay/sand that free-drained and drained under compression without increasing the amount of inorganic anion in the drainage water. This test was repeated at the same zeolite and calcium diacrylate copolymer dosages but with the addition of a solution of high molecular weight cationic flocculant at a dosage of 0.312 kg per ton of fines. Drainage and drainage water clarity were further improved.

The addition of high molecular weight cationic flocculant to the zeolite/calcium diacrylate copolymer system described above produced large, dense aggregate that drained faster than the floc produced by the addition of inorganic divalent cation salt. After free-draining, the aggregate structure could be hand-compressed to a solid with the release of clear water. Tailings-pond fine clay slurry alone, that drains freely and continues to drain under compression, produced a solid and clear water. The aggregation of the clay using the calcium diacrylate/acrylamide copolymer followed by addition of cationic flocculant produced even larger aggregates of clay to produce a free-draining solid.

The research set out to reduce the inorganic anion loading (in this instance $SO_4$ from the magnesium sulfate) in the reclaim water. The table below of comparative reclaim process water analyses shows this was achieved:

| Ions | Reclaim water in all three tests mg/l | Reclaim water using $MgSO_4$ mg/l | Reclaim water using Ca diacrylate copolymer mg/l |
|---|---|---|---|
| $SO_4$ | 648 | 1000 | 459 |
| Mg | 10 | 65 | 4 |
| Ca | 16 | 13 | 7 |

The sulfate ion from the $MgSO_4$ addition is significantly increased, as would be expected. The increase in Mg ion suggests a lower than stoichiometric exchange with the zeolite. The calcium ion on the diacrylate/acrylamide copolymer has apparently been very efficiently exchanged onto the zeolite (calcium ion at or below background).

Example 5

Branched Polyacrylate

Two 0.4% solutions of calcium diacrylate copolymer were prepared. One of the calcium diacrylate polymers had been lightly branched with 1 ppm of MBA. The solutions were applied to separate samples of a viscous, 30% clay solids Mature Fine Tailings from an Alberta oil sands operation. The aggregated structure produced with the slightly branched calcium diacrylate polymer released water faster, in larger volume, and with better clarity.

Example 6

Aggregating and Dewatering by Centrifugation

One method of dewatering mature fine tailings (MFT) (<44 micron clays in 35% to 40% dispersions) is to centrifuge to produce a soft solid. The soft solid can then be left to air dry or possibly mixed with sand to produce a depositable, trafficable solid. In the past, the feed of MFT to the centrifuge has been treated with a solution of conventional monovalent anionic flocculant such as a polymer of sodium acrylate or a copolymer of sodium acrylate/acrylamide. This treatment, in an amount of about 1300 grams of flocculant per ton of fines, forms a paste-like structure for centrifugation and assists in dewatering to give a dewatered, still paste-like "cake." However, the clay solids in this paste-like cake, while of higher concentration than the feed to the centrifuge, are unchanged in that they are constituted by the same <44 micron fines as before treatment. This can be easily seen by simply re-dispersing some of the "cake" in water, where it form a non-settling, uniform dispersion of the <44 micron particles. The fact that the fines are unchanged means that they present the same problems in producing the ultimately desirable trafficable solids necessary for site reclamation.

In a comparative centrifuge demonstration, the same <44 micron MFT was treated with 950 grams/ton of the calcium diacrylate copolymer described above. Over a series of centrifuge speed and time studies, comparing the calcium diacrylate copolymer with the 1300 grams/ton of sodium acrylate copolymer, the deposition rate with the calcium diacrylate was about twice as fast as with the sodium acrylate at any given speed and the supernatant water with the calcium diacrylate significantly clearer (to the extent of being solids-free). When the speed and test time was run to deposit the same visual level of solids as with the calcium diacrylate copolymer, and the supernatant waters poured off, the sodium acrylate-treated solids were soft and flowable. The calcium diacrylate-treated solids were stiff and difficult to remove from the centrifuge tube.

As mentioned above, when centrifuged sodium acrylate-treated solids were re-dispersed in water, they formed a stable dispersion of the same <44 micron particles. However when the centrifuged, stiff calcium diacrylate-treated solids were re-dispersed in water they showed the same aggregated particle size that has demonstrated improved drainage in other fines-treatment regimens according to the invention. When dispersed in water, the visible calcium diacrylate-treated particles from the centrifuge test immediately settled, leaving only clear water. Since none of these calcium diacrylate-treated particles were less than 44 microns in size after centrifugation, this suggests that the downstream problems of production of trafficable solids, from these now-coarse, aggregated fines, will be mitigated according to the invention.

CONCLUSION

It is well-known in industry in general, and in the oil sands in particular, that divalent ions have an affinity for clays, particularly swellable sodium clays. The most commonly used flocculants in clay systems in mining, particularly in oil sands mining operations, are sodium polyacrylate copolymers (see the multiple references to anionic sodium polyacrylates in CA 2,515,581, for example) that do not have a chemical affinity for sodium clays. Therefore, the discovery of the invention is of significant economic importance. In this mechanism, the natural affinity of a divalent cation for clay, when the divalent cation is chemically part of a high-molecular-weight polymer, provides both the destabilization of the clay and the clays chemical fixation to the polymeric backbone. This results in a self-dewatering structure and a structure that drains under compression.

The foregoing detailed description is given for clearness of understanding only, and no unnecessary limitations should be understood therefrom, as modifications within the scope of the invention may become apparent to those skilled in the art.

The invention claimed is:

1. A method of treating an aqueous mineral slurry to disperse and separate the components of the slurry, to enhance recovery of components of the slurry, and to enhance dewatering of solids in the resulting residual slurry for water recovery and solids reclamation, said method comprising:
(a) providing an aqueous slurry comprising slurrying water and monovalent-form clay;
(b) optionally adding to the slurry of (a) a sodium or potassium zeolite having a weight ratio of aluminum to silicon in the range of about 0.72:1 to about 1.3:1 in an amount sufficient to disperse and separate the clay to form a dispersed slurry; and,
(c1) adding to the slurry of (a) sufficient quantities of a water solution of a polymer reactive with said clay, said polymer being selected from the group consisting of water-soluble multivalent cation-containing acrylate copolymers, to cause the polymer to react with the clay of (a) to cause the clay to immediately begin to floc and settle to form a product comprising a floc and supernatant water, thereby enhancing separation and subsequent recovery of the clay and enhancing subsequent water removal and consolidation of residual components of the product; or
(c2) adding to the dispersed slurry of (b) sufficient quantities of a water solution of a polymer reactive with said clay and said zeolite, said polymer being selected from the group consisting of water-soluble multivalent cation-containing acrylate copolymers, to cause the polymer to react with the zeolite to immediately neutralize the dispersive effect of the zeolite in (b) to cause the clay to immediately begin to aggregate and settle to form a product comprising a flocced aggregate and supernatant water, thereby enhancing separation and subsequent recovery of the clay and enhancing subsequent water removal and consolidation of residual components of the product; and,
(d) optionally adding to the product of (c1) or (c2) a cationic coagulant or cationic flocculant to improve the strength of the floc and/or floc drainage and/or to improve the clarity of the supernatant water.

2. The method of claim 1 wherein the polymer solution is substantially free of monovalent cation-containing acrylate polymers.

3. The method of claim 1 wherein the multivalent cations are selected from the group consisting of calcium, magnesium, iron, and aluminum.

4. The method of claim 1 wherein only a single species of multivalent cation is present in the polymer solution.

5. The method of claim 1 wherein the polymer is a calcium- or magnesium-containing diacrylate copolymer with acrylamide.

6. The method of claim 1 wherein the polymer is a diacrylate/acrylamide copolymer.

7. The method of claim 1 wherein the polymer is a diacrylate/acrylamide/2-acrylamido-2-methylpropane sulfonic acid (AMPS) terpolymer.

8. The method of claim 1 wherein the polymer has an intrinsic viscosity of at least 3 dl/gm.

9. The method of claim 1 comprising adding said zeolite of (b) to said slurry of (a) to form a dispersed slurry and thereafter adding said polymer to said dispersed slurry in sufficient quantity to neutralize the dispersive effect of the zeolite and to form a floc.

10. The method of claim 1 comprising enhancing separation and subsequent recovery of the clay and enhancing subsequent water removal and consolidation of residual components of the slurry by adding sand to the product of (c1) or (c2).

11. The method of claim 1 wherein said polymer is a calcium diacrylate/acrylamide copolymer, or a calcium diacrylate/acrylamide/2-acrylamido-2-methylpropane sulfonic acid (AMPS) terpolymer, having an intrinsic viscosity of at least 3 dl/gm.

12. The method of claim 11 comprising applying momentary mechanical shear to a solution of the polymer sufficient to reduce the breadth of the molecular weight distribution of the polymer.

13. The method of claim 1 comprising adding the zeolite of (b) to the slurry of (a) in the form of a solution prepared by a method comprising admixing an aqueous solution of sodium silicate or potassium silicate with an aqueous solution of sodium aluminate to form a reaction mixture, and immediately diluting the reaction mixture to a zeolite concentration of about 0.5 wt % or less to terminate the reaction and to stabilize the product.

14. The method of claim 13 wherein the respective concentration of each of said sodium silicate or potassium silicate solutions and said sodium aluminate solution in the reaction mixture is greater than 1.5 wt %.

15. The method of claim 13 wherein said sodium silicate has an $SiO_2/Na_2O$ weight ratio of about 1.8:1 to about 3.25:1.

16. The method of claim 13 wherein said sodium silicate has an $SiO_2/Na_2O$ weight ratio of about 2.58:1.

17. The method of claim 13 wherein said zeolite has an Al/Si weight ratio of about 1:1.

18. The method of claim 1 wherein the clay is a swellable, sodium clay.

19. The method of claim 18 wherein the clay is a bentonite/montmorillonite clay.

20. The method of claim 1 wherein the clay is expressed as $Na.Al_2SO_3.4SiO_2.H_2O$.

21. The method of claim 1 wherein the polymer is a calcium- or magnesium-containing diacrylate copolymer.

22. The method of claim 21 wherein the polymer is a diacrylate/acrylamide copolymer.

23. The method of claim 22 wherein the polymer is a diacrylate/acrylamide/2-acrylamido-2-methylpropane sulfonic acid (AMPS) terpolymer.

24. The method of claim 1 wherein said slurry of (a) contains organic materials.

25. The method of claim 1 wherein said clay comprises particles 44 microns or less in size.

26. The method of claim 1 wherein said slurry contains a mineral ore.

27. The method of claim 1 wherein said slurry contains bitumen.

28. The method of claim 1 wherein said slurry contains sand, clay, bitumen, and water.

29. The method of claim 28 wherein the clay is a swellable, sodium clay.

30. The method of claim 29 wherein the clay is a bentonite/montmorillonite clay.

31. The method of claim 30 wherein the clay is expressed as $Na.Al_2SO_3.4SiO_2.H_2O$.

32. The method of claim 1 wherein the copolymer is branched.

33. The method of claim 1, comprising centrifuging said slurry to separate the components of the slurry into supernatant water and solid particles.

* * * * *